US 6,665,588 B2

(12) United States Patent
Watanabe et al.

(10) Patent No.: US 6,665,588 B2
(45) Date of Patent: Dec. 16, 2003

(54) WORKPIECE UNLOADING APPARATUS

(75) Inventors: Atsushi Watanabe, Tokyo (JP); Katsutoshi Takizawa, Tokyo (JP); Kazunori Ban, Yamanashi (JP); Ichiro Kanno, Yamanashi (JP)

(73) Assignee: Fanuc Ltd., Yamanishi (JP)

( * ) Notice: Subject to any disclaimer, the term of this patent is extended or adjusted under 35 U.S.C. 154(b) by 0 days.

(21) Appl. No.: 10/193,172

(22) Filed: Jul. 12, 2002

(65) Prior Publication Data

US 2003/0018414 A1 Jan. 23, 2003

(30) Foreign Application Priority Data

Jul. 19, 2001 (JP) .......................................... 2001-220242

(51) Int. Cl.[7] .............................................. G05B 15/00
(52) U.S. Cl. ....................... 700/259; 700/213; 414/796.5
(58) Field of Search .................................. 700/213, 218, 700/245, 258, 259; 414/795.4, 796.5, 796.9

(56) References Cited

U.S. PATENT DOCUMENTS 6,445,979 B1 * 9/2002 Inoue et al. ................. 700/258

FOREIGN PATENT DOCUMENTS

| EP | 0812662 | 12/1997 |
|----|---------|---------|
| JP | 03 092227 | 4/1991 |
| JP | 05285800 | 11/1993 |

* cited by examiner

Primary Examiner—Khoi H. Tran
(74) Attorney, Agent, or Firm—Staas & Halsey LLP

(57) ABSTRACT

A workpiece is gripped and unloaded by moving workpiece unloading means based on the results of measuring the workpiece position and orientation with a visual sensor. When a plurality of loaded workpieces are unloaded in a regular order one by one, or in groups, the position and orientation of the workpiece which is to be unloaded next change for each unloading. However, since a visual sensor is moved when necessary to the position appropriate for measuring the workpiece position and orientation, measurements of the workpieces with the visual sensor are conducted accurately. Therefore, the workpiece unloading is conducted reliably.

20 Claims, 6 Drawing Sheets

WORKPIECE UNLOADING APPARATUS

BACKGROUND OF THE INVENTION

1. Field of the Invention

The present invention relates to a workpiece unloading apparatus for unloading, at least one by one, articles such as metal sheets and panels stacked and loaded, for example, on a pallet, a rack, and the like.

2. Description of the Related Art

Japanese Patent Application Laid-open No. 3-92227 discloses an unloading apparatus equipped with special means for workpiece cutting and unloading, wherein a plurality of metal sheets and panel subjected to pressing and bending are unloaded one by one with an automatic machine from a state in which they are stacked and loaded vertically or horizontally. For example, in the automobile production process, press-formed body panels usually can be easily delivered upon stacking horizontally (stacking from bottom to top) or vertically (stacking in the horizontal direction) on a pallet or rack. Accordingly, there is a strong demand that the operation of unloading of the loaded workpieces one by one with a multipurpose commercial robot and supplying them to the next production process be automated.

Because the sheet-like workpieces thus located on a pallet or rack typically have a shape with peaks and valleys, inclination (orientation) of individual workpieces varies in the upper and lower portions of stacked pile. Furthermore, a troublesome effect is encountered in case of unloading from a state in which a plurality of articles are suspended and supported on a rack. Thus, because the workpieces are engaged with each other, when the front workpiece is unloaded, the next workpiece is also pulled out and the position and orientation change with each unloaded workpiece.

With the conventional robots of a teaching-playback system, smooth unloading operation is difficult to conduct under the above-described conditions. For this reason, the following methods have been employed: (1) a method of manually unloading the workpieces one by one, setting the workpieces in advance in a special positioning jig and then handling them with a robot; (2) a method of unloading by installing a contact-type sensor on the distal end of a robot and determining the position and orientation of workpieces by contact with a plurality of zones on the workpiece.

With the method (1), a significant manual labor is obviously required to align the workpieces. The problem associated with the method (2) is that measurements are time consuming. Moreover, the accuracy is poor and insufficient for unloading. Such problems are often encountered not only in the above-described automobile production process, but also in cases of unloading horizontally or vertically stacked metal sheets subjected to pressing or bending, flat or curved glass sheets, printed boards, flat boxes, flatly folded cloths and clothing, food plates, plastic moldings, wood materials, and the like.

SUMMARY OF THE INVENTION

It is an object of the present invention to provide a workpiece unloading apparatus constructed so as to unload the workpieces that are stacked horizontally or vertically, as described above, in an orderly manner and smoothly without manually aligning them in advance.

In accordance with the present invention, in order to resolve the above-described problems, the position and orientation of the topmost (in case of horizontal stacking) or frontmost (in case of vertical stacking) workpiece of the loaded workpieces are found with a visual sensor, and workpiece unloading means such as a robot is operated and the workpieces are unloaded based on the found position and orientation. The workpiece unloading apparatus in accordance with the present invention is mainly applicable to a case when horizontal or vertical stacking of a plurality of workpieces causes significant changes in the position or orientation of each workpiece or groups of workpieces that are to be unloaded.

Yet another problem is that unless a visual sensor is placed in an appropriate position with respect to a workpiece, which is the object of measurement, the sensor fails to detect the workpiece or the necessary measurement accuracy cannot be obtained. Therefore, when the position and orientation of the workpiece which is to be unloaded next vary significantly for each workpiece unloading operation, the workpiece measurement has to be conducted by constantly arranging the visual sensor in the appropriate position.

In accordance with the present invention, the position and orientation of the visual sensor can be varied by mounting the visual sensor on sensor movement means such as a robot. Further, the position and orientation appropriate for measuring the topmost or frontmost workpiece are determined by means for determining the workpiece measurement position of the visual sensor according to the workpieces stacking state, and the visual sensor is moved into this position. The position and orientation of the workpiece are then measured with the visual sensor, the workpiece unloading means is moved to the workpiece unloading position based on the measurement results, and the workpiece is gripped and unloaded.

In accordance with the present invention, the above-described problems are resolved by providing the following features to a workpiece unloading apparatus that unloads a plurality of workpieces stacked horizontally or vertically, at least one by one in a regular order, starting from the topmost or frontmost workpiece.

The workpiece unloading apparatus in accordance with the present invention comprises a visual sensor for finding the position and/or orientation of a workpiece, sensor measurement position determination means for determining the position of the visual sensor for measuring the topmost or frontmost workpiece, sensor movement means for moving the visual sensor to the position determined by sensor measurement position determination means, and workpiece unloading means for unloading the workpieces. Once the visual sensor has been moved by sensor movement means to the position determined by sensor measurement position determination means, the information relating to the position and/or orientation of the topmost or frontmost workpiece is obtained by the visual sensor, and workpiece unloading means unloads a workpiece based on the obtained information.

In particular, with the workpieces having a plate-like shape, when a plurality of stacked workpieces are unloaded in a regular order one by one or in groups, the position and orientation of the workpiece which is to be unloaded next change every time. However, in accordance with the present invention, because the visual sensor can be moved to a position appropriate for measurements, the workpieces can be unloaded accurately based on the measurement results obtained from the visual sensor. The workpiece unloading is conducted especially accurately when the workpiece location region is larger than the measurement field of view of the sensor.

The above-described workpiece unloading apparatus can have the following embodiments.

Examples of workpieces that can be unloaded with the workpiece unloading apparatus include metal sheets subjected to pressing or bending, flat or curved glass sheets, printed boards, flat boxes, flatly folded cloths or clothing, food plates, plastic moldings, and wood materials.

Determination of the position of visual sensor by the sensor measurement position determination means is conducted repeatedly for each unloading process of each workpiece unloading operation, periodically or non-periodically. Though the position and orientation of the workpiece which is to be unloaded next change with each unloaded workpiece, the position and orientation of the visual sensor are changed appropriately in necessary periods. As a consequence, information relating to the position and orientation of the workpieces can be obtained reliably with the visual sensor and, therefore, the workpiece unloading can be conducted accurately.

Determination of the visual sensor position with sensor measurement position determination means is conducted based on the position and/or orientation of the workpiece measured with the visual sensor during the preceding or even earlier workpiece unloading.

Determination of the visual sensor position with sensor measurement position determination means is conducted based on the visual sensor position and orientation during the preceding or even earlier workpiece unloading.

Determination of the visual sensor position with sensor measurement position determination means is conducted based on the position and/or orientation of the workpiece gripped by workpiece unloading means during the preceding or even earlier workpiece unloading.

Determination of the visual sensor position with sensor measurement position determination means is conducted based on the thickness of one workpiece which is to be unloaded, the number of workpieces, or the thickness of loaded workpieces.

Determination of the visual sensor position with sensor measurement position determination means is conducted based on information relating to the approximate position and/or orientation of the topmost or frontmost workpiece, this information being obtained with a second visual sensor in the position that was stored in advance. As a result, because two visual sensors are used for workpiece measurement, a respective time is required for processing the information obtained by the sensors. However, when the position and orientation of the workpiece which is to be unloaded next changes significantly with each unloaded workpiece, this method is effective because the workpiece measurement position of the visual sensors can be determined with good efficiency.

A three-dimensional visual sensor is used as the visual sensor.

The visual sensor whose position is determined with sensor measurement position determination means is also used as the above-mentioned second visual sensor. As a result, providing one visual sensor with two sensor functions makes it possible to construct the entire apparatus at a low cost.

A visual sensor conducting two-dimensional image processing with a camera is used as a second visual sensor.

A robot is used as sensor movement means. The visual sensor is mounted on the hand or arm of the robot.

A robot is used as workpiece unloading means.

Sensor movement means serves also as workpiece unloading means.

A plurality of workpieces, which are stacked vertically or horizontally, are housed in or supported by a housing member such as a pallet, a trolley, a rack or a hanger for suspending the workpieces, and a box.

When the number of workpieces housed in or supported by the housing member, or the thickness of loaded workpieces is below the prescribed value, a signal is output to the outside or a message is displayed. As a result, replenishment of the workpieces can be conducted in appropriate periods of time.

A specific feature is provided on the housing member, this feature being concealed by a workpiece and undetectable when the workpiece is present. A decision as to whether the workpiece is housed in or supported by the housing member is made according to the detection or non-detection of this specific feature with a visual sensor. As a result, replenishment of the workpieces can be conducted in appropriate periods of time.

Information relating to at least one of the thickness of one workpiece, the number of workpieces, and the thickness of loaded workpieces is provided by attaching to the housing member in a mechanically recognizable form, such as a bar code, figures, numerals, or marks. Any information on the thickness of one workpiece, the number of workpieces, and the thickness of loaded workpieces is automatically obtained by reading with a reading device. As a result, operation can be continuously conducted even when the number of workpieces loaded into the housing member is not constant.

When information on the thickness of loaded workpieces is used, information on the thickness of stacked workpieces may be obtained by detecting the information on the thickness of loaded workpieces with the visual sensor, second visual sensor, or other sensor means.

pressing means is provided such that when the workpieces suspended and supported on a rack or a hanger are unloaded, the presence or absence of the forward movement of the workpiece is detected from the position and/or orientation of the workpiece obtained with the visual sensor, and if the workpiece moved forward, the pressing means presses the workpiece backward.

BRIEF DESCRIPTION OF THE DRAWINGS

The foregoing and other objects and features of the invention will become apparent from the following description of the preferred embodiments of the invention with reference to the accompanying drawings, in which.

DETAILED DESCRIPTION OF THE INVENTION

Figure 1:
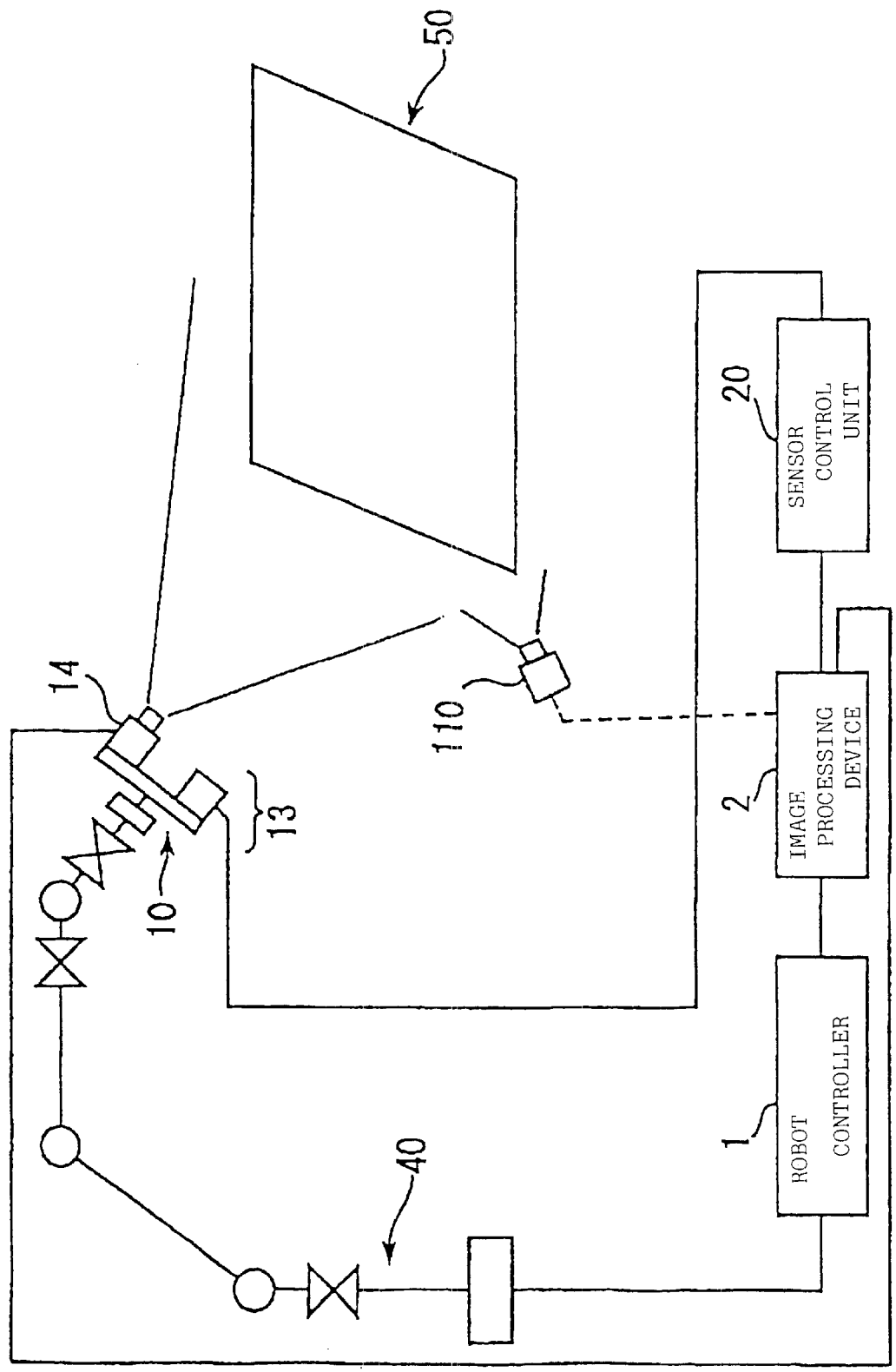
FIG. 1 shows the entire structure of the workpiece unloading apparatus of one embodiment of the present invention.

FIG. 1 schematically illustrates the workpiece unloading apparatus of one embodiment of the present invention. The workpiece unloading apparatus comprises a robot controller 1, an image processing device 2, a three-dimensional visual sensor 10 using a laser, a sensor control unit 20 of the three-dimensional visual sensor, and a robot 40. The three-dimensional visual sensor 10 is carried by the wrist of a robot 40. Both the robot controller 1 and the image processing device 2 have a well-known structure equipped with a CPU, data memory, frame memory, image processing processor, interface, and the like. Detailed description of configurations and functions thereof is omitted.

The reference numeral 50 denotes loading means (more specifically, a position where the loading means is located) such as a pallet or rack onto which the workpieces, which are the unloading objects, have been loaded. The workpieces, which are not shown in the figure herein, and the loading mode thereof will be described hereinbelow.

Further, if necessary, an auxiliary sensor 110 is arranged in the vicinity of the position where the workpiece loading means 50 is located. The auxiliary sensor 110, as will be described hereinbelow, can be used for rough measurement of a workpiece which is next to be unloaded (or a workpiece being uppermost or frontmost at this point of time). For example, the auxiliary sensor may be a visual sensor picking up images with a camera and conducting two-dimensional image processing with the image processing device 2.

In the present embodiment, one robot 40 is used as both the sensor movement means and the workpiece unloading means. A hand for grasping the workpieces (not shown in the figure) is mounted on the hand of robot 40. Hands of a variety of types, shapes, sizes, and grasping modes are known, and which of them is to be selected is decided at a design stage according to the type, shape, and size of the workpieces which are to be grasped.

The tree-dimensional visual sensor 10 measures the three-dimensional position and orientation of objects. A variety of such sensors are known, for example, sensors employed in a stereo system based on a plurality of CCD cameras and sensors in which a spot- or slit-like light is illuminated as a reference light. As an example, a case will be described hereinbelow in which a three-dimensional visual sensor using a slit light as a reference light is employed.

Figure 2:
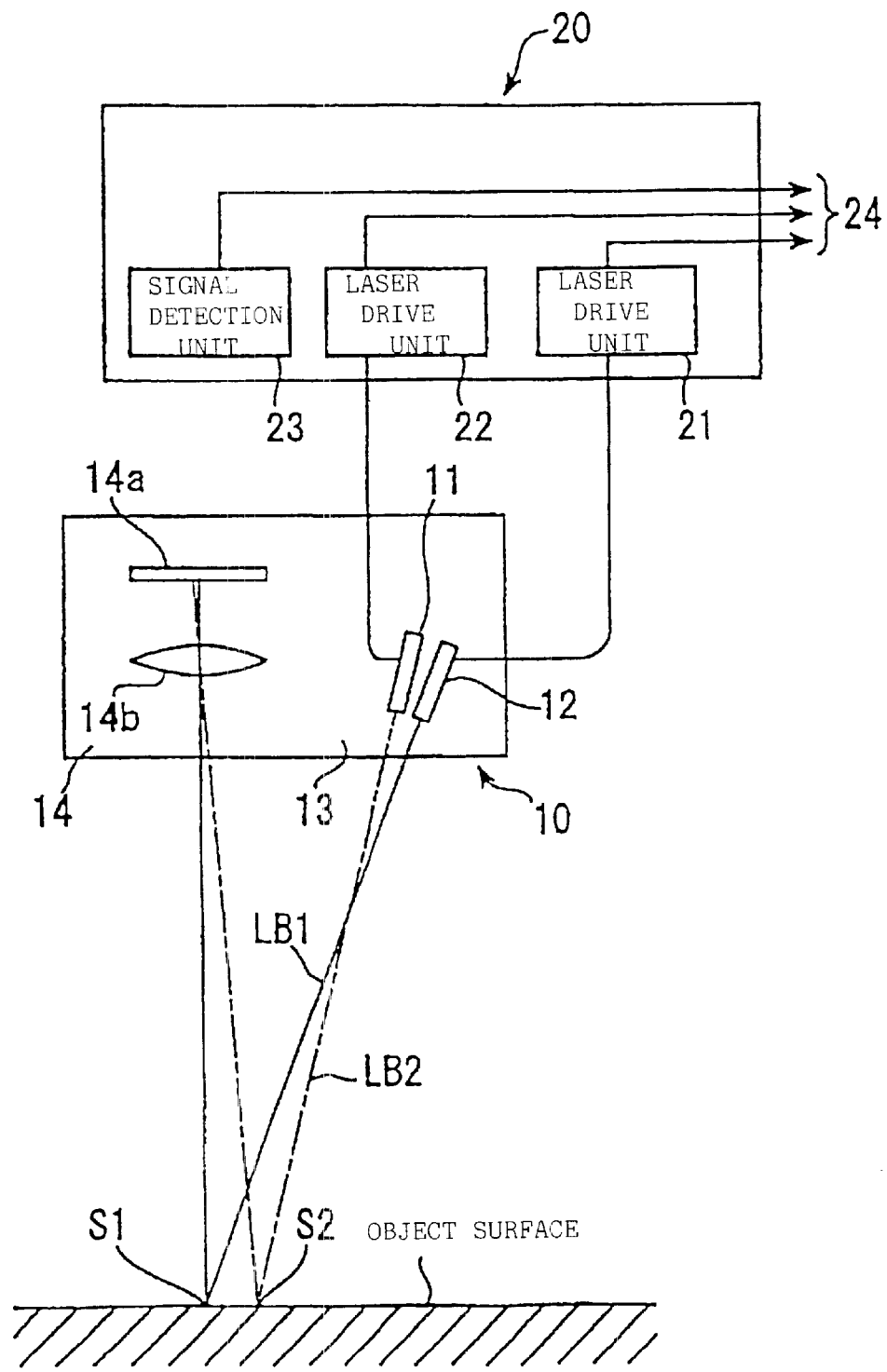
FIG. 2 shows a schematic configuration of the three-dimensional visual sensor used in the workpiece unloading apparatus shown in FIG. 1.

FIG. 2 schematically illustrates a three-dimensional visual sensor. A projection unit 13 of sensor 10 comprises laser generators 11 and 12, and a photodetection unit 14 comprises a photoreceptor element 14a and an optical system 14b for light formation. If an operation command of laser sensor is received from the image processing device 2 via a line 24, laser drive units 21, 22 drive the laser generators 11, 12 and laser beams LB1 and LB2 are generated. Laser beams that were diffusion reflected in the reflection points S1, S2 on the object surface are used by the optical system 14b to form an image on the photoreception element 14a according to the positions of reflection points S1, S2. A CCD or the like can be used for the photoreception element.

Figure 3:
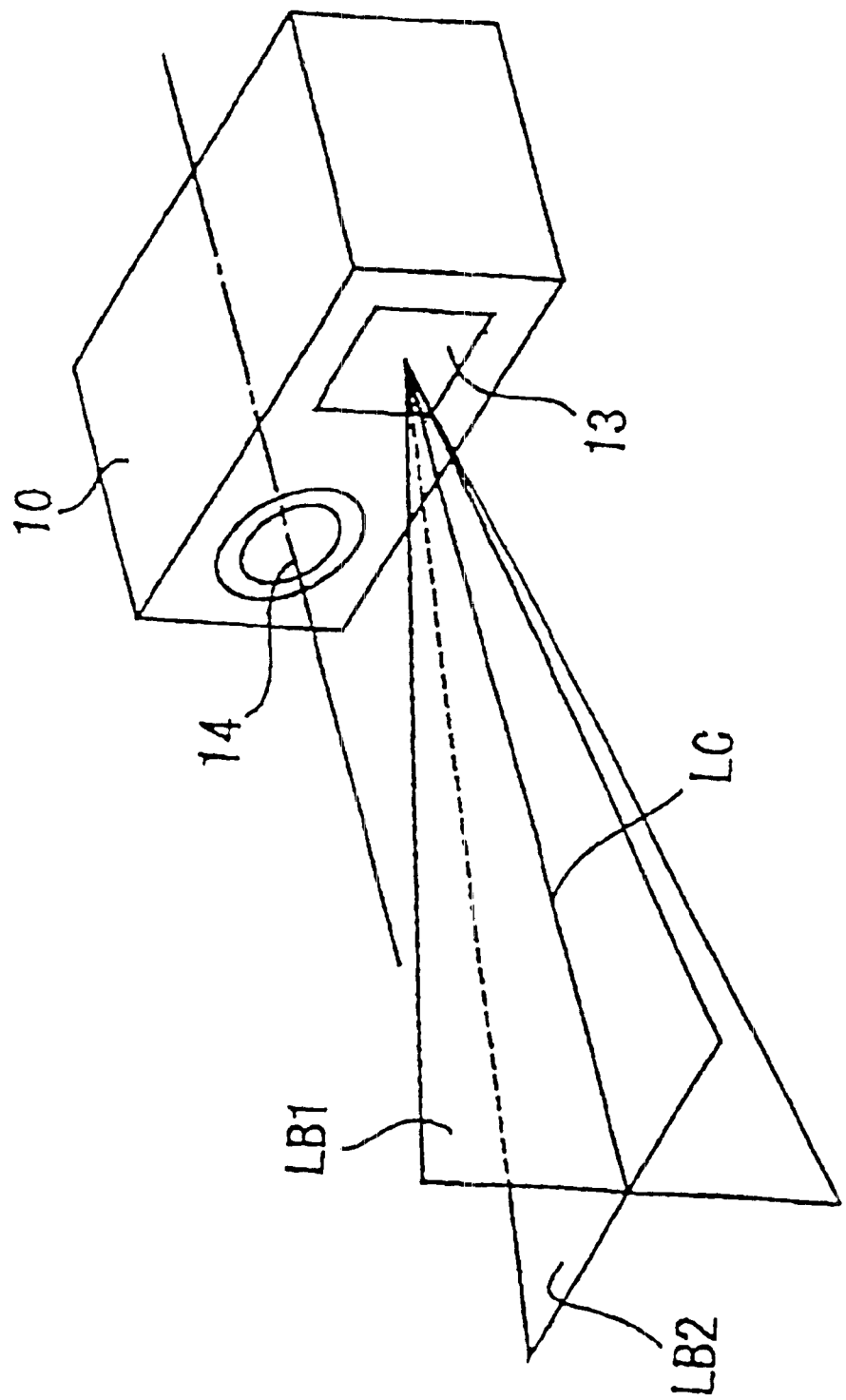
FIG. 3 illustrates the calibration of the three-dimensional visual sensor projecting two laser beams.

In the present example, a two-dimensional CCD array is used as the photoreceptor element 14a. The three-dimensional visual sensor 10 has a structure in which two laser beams are projected. As shown in FIG. 3, the laser slit beams define the respective planes and line LC of intersection thereof is formed. The positional relationship of the planes or line LC of intersection produced by those beams LB1, LB2 and the laser sensor body is found in advance by calibration conducted by the well-known procedure.

During measurements, the position of reflection points S1, S2 of laser beam on the photoreception element is detected by the image processing device 2, and the three-dimensional position of reflection points is calculated based on a triangulation principle by the image processing device 2 from the plates formed by the laser slit beams LB1, LB2 and the position of reflection points on the photoreception elements.

Finding the positions of a plurality of reflection points makes it possible to find the three-dimensional position and orientation of measurement object. Furthermore, with the positional relationship of three-dimensional visual sensor 10 and robot 40 having been fixed and already known, the position and orientation of the object can be found as values in the space of the coordinate system which the robot 40 has. Because such three-dimensional visual sensors and operation thereof are a matter of public knowledge, any additional explanation thereof is herein omitted.

Figure 4:
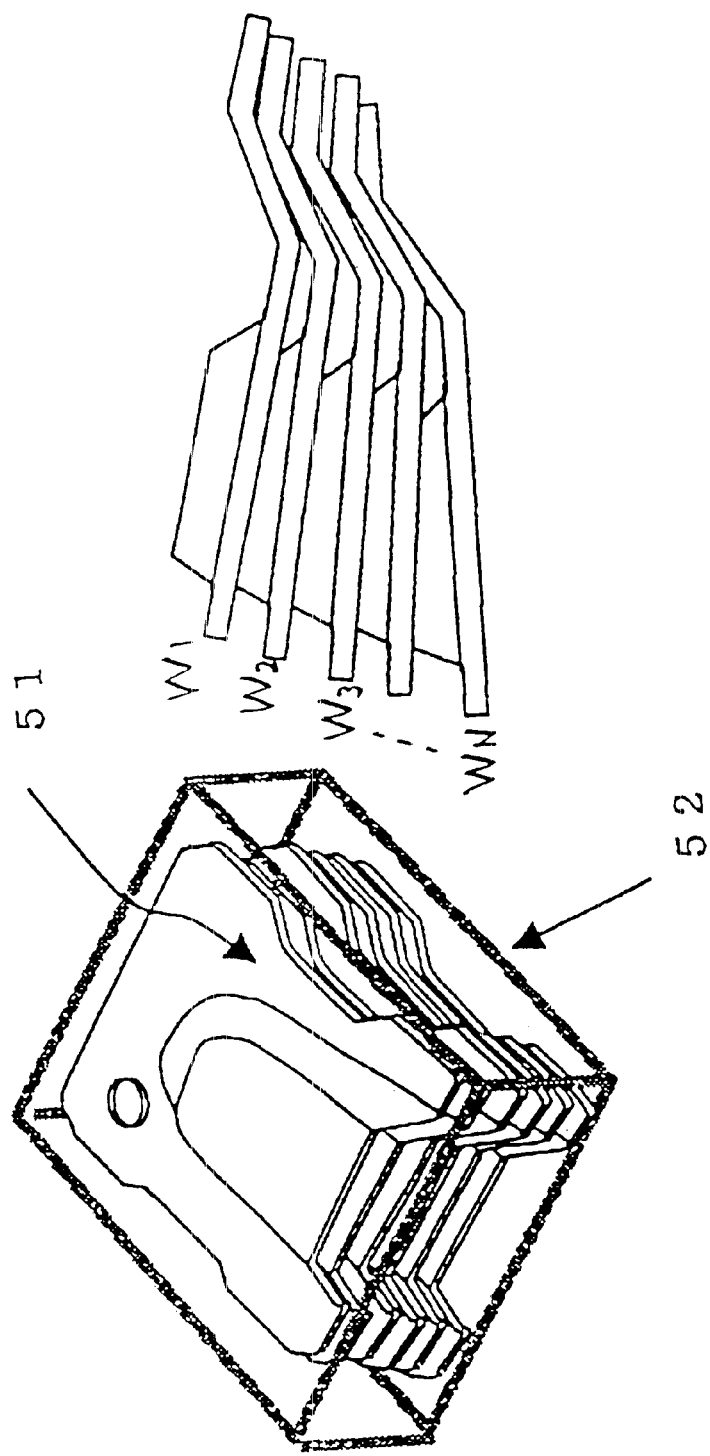
FIG. 4 illustrates a state in which the workpieces which are to be unloaded with the unloading apparatus are stacked horizontally.
Figure 5:
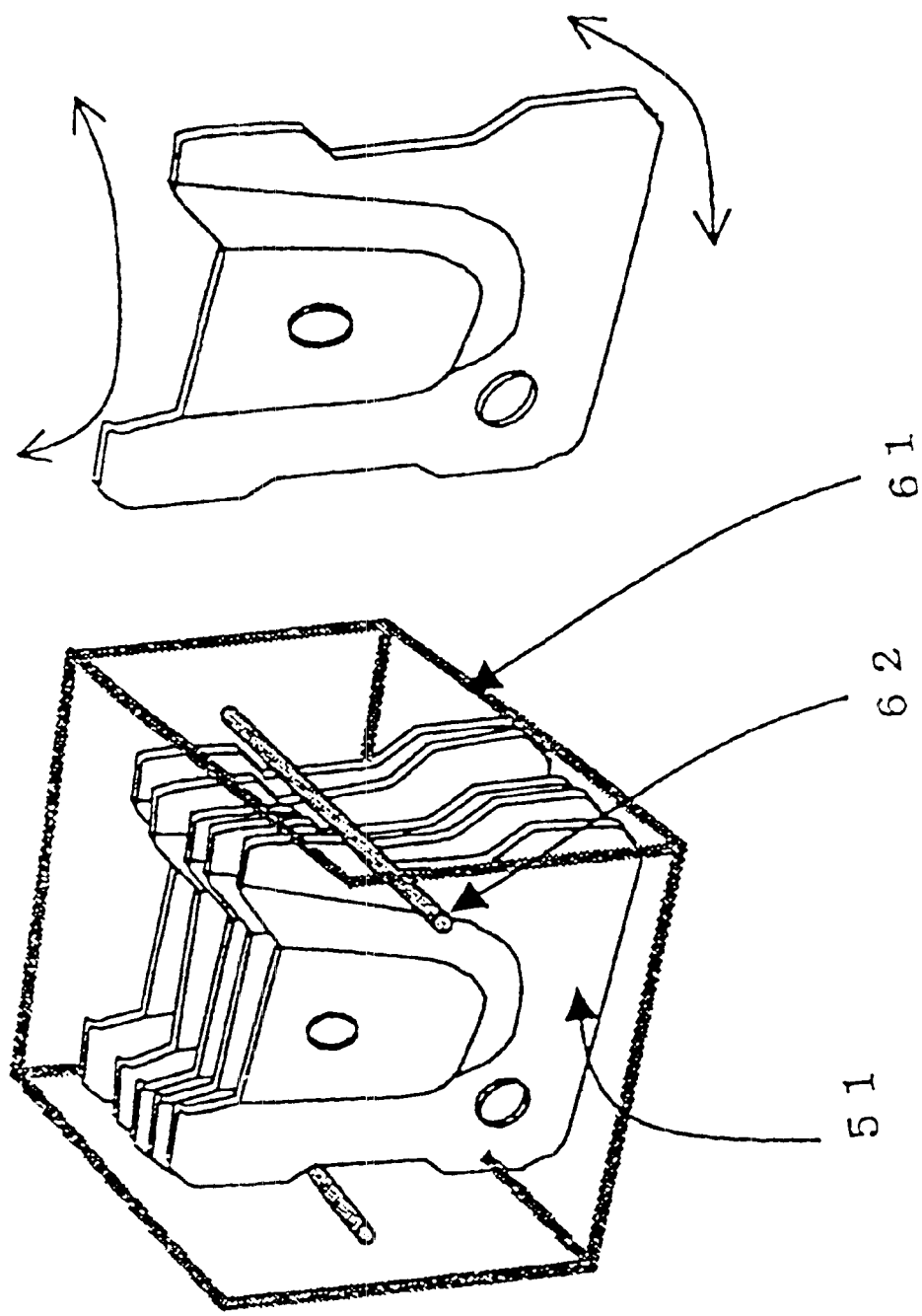
FIG. 5 illustrates a state in which the workpieces which are to be unloaded with the unloading apparatus are stacked vertically.

FIG. 4 and FIG. 5 illustrate a case in which the individual workpieces are flat-shaped components having protrusions and recesses, and those workpieces are stacked horizontally (FIG. 4) or vertically (FIG. 5) and supplied onto the workpiece loading means 50 shown in FIG. 1.

In the example shown in FIG. 4, workpieces 51 are supplied onto the workpiece loading means 50 in a state in which they are stacked horizontally in a box-like housing member 52. Since the workpieces have protrusions and recesses and are not simple planes, stacking of the workpieces changes the position and inclination of lower workpieces and upper workpieces, as shown in the figure.

On the other hand, in the case shown in FIG. 5, a rack 61 in which the workpieces are suspended vertically and supported is a housing member, and the workpieces 51 are stored in a state in which a plurality thereof are suspended on and hung down from support members 62 or rack 61. In the state shown in FIG. 5, a gap appears between two workpieces, and the position and orientation change for each single workpiece. Furthermore, with a plurality of workpieces in intimate contact with each other, when the frontmost workpiece is unloaded forward, the workpiece which is immediately behind it can be dragged and moved forward. For this reason, the gap between the adjacent workpieces and the position and orientation of the frontmost workpiece can change in each cycle.

The workpieces such as shown as an example in FIG. 4 and FIG. 5 sometimes have a large surface area exceeding 1 m×1 m. Furthermore, from the standpoint of efficiency of materials flow, as many workpieces as possible are commonly loaded. Therefor, the height to which the workpieces are stacked as shown in FIG. 4 or the thickness of the entire set of workpieces that hang down vertically, as shown in FIG. 5, sometimes exceed 1 m.

On the other hand, because of a specific structure of visual sensors, there is the so-called tradeoff relationship between the range in which measurements can be conducted and measurement accuracy, and if a high accuracy is desired, the measurement range is narrowed. It goes without saying that highly accurate measurements are desired to increase the reliability of operations. Therefore, in the result, it becomes important to position the sensor in the appropriate position and orientation within the range in which measurements can be conducted.

Problems such as impossibility of measurements, erroneous detection, decrease of measurement accuracy, and the like rise when the visual sensor is outside the appropriate measurement range. For example, the accuracy required when the operations of unloading and supply to the next process are conducted with a robot, is usually within about several millimeters, and a measurement range of the visual sensor of about several centimeters to several tens of centimeters is required to realize such an accuracy.

Thus, the measurement range is much narrower than the presence range of above-described typical workpieces. Therefore, with the visual sensor arranged fixedly, it is impossible to measure the position and orientation of all of the workpieces and to unload the workpieces. In the present embodiment of the invention, such a difficulty is overcome by arranging the visual sensor in appropriate positions and orientation. The workpiece unloading process conducted in accordance with the present invention will be described below.

The process explanation will be started from the moment in which the workpieces W1, W2, . . . , WN loaded as shown in FIG. 4 were placed in the pallet position 50 shown in FIG. 1.

Let us assume that a certain number (N) of workpieces are loaded in the housing member 52 and that the position, orientation, and height of the workpiece W1 which is the uppermost one of workpieces 51 are known in advance, while the position, orientation, and height of other workpieces W2, W3, . . . , WN are unknown. The number N of workpieces is also assumed to be known.

The position and orientation of sensor 10 suitable for measuring the uppermost loaded workpiece W1 are identified by the instructions in the program of robot controller 1. Finding the position and orientation of sensor 10 according to the instructions in the program will be referred to herein as a "first sensor position and orientation determination".

As the program is executed, the robot 40 moves and the sensor 10 moves into the workpiece W1 measurement position. This procedure will be referred to as a "first sensor positioning".

A measurement initiation command from the robot controller 1 is then sent to the image processing device 2, and the position and orientation of workpiece W1 are measured by the sensor 10. This procedure will be referred to as a "first workpiece position and orientation measurement".

The results of the first workpiece position and orientation measurement are transmitted to the robot controller 1. Based on those measurement results, the robot controller 1 moves the robot 40 to a workpiece unloading position and workpiece W1 is unloaded. The procedure of robot movement and subsequent procedure of unloading the workpiece W1 will be referred to herein as an "access to the first workpiece" and a "first workpiece unloading".

With the uppermost workpiece W1 unloaded, the workpiece W2 that has been stacked second from the top prior to the execution of the present program now appears at the top. The position and orientation of sensor 10 for measuring this workpiece W2 are found by calculations with the robot controller 1 so that the sensor 10 assumes the prescribed position and orientation with respect to the position and orientation of workpiece W1 that have been measured by sensor 10 during previous unloading. This procedure will be referred to as a "second sensor position and orientation determination".

The position of robot 40 shifts so as to conduct positioning of sensor 10 according to the results of the second sensor position and orientation determination. This procedure is referred to as a "second sensor positioning".

In this new measurement position, the sensor 10 measures the position and orientation of workpiece W2 which is presently the topmost workpiece. This procedure will be referred to as a "second workpiece position and orientation measurement".

The robot 40 again moves into the workpiece unloading position and workpiece W2 is unloaded based on the result of the second workpiece position and orientation measurement. Those procedures will be referred to as a "access to the second workpiece" and a "second workpiece unloading".

The process from the i-th (i>2) sensor position and sensor determination to the i-th workpiece unloading is conducted similarly to the above-described process from the second sensor position and orientation determination to the second workpiece unloading. One cycle of operation is thus completed by unloading the N workpieces W1, W2, . . . , WN, loaded on the workpiece loading means 50, in a regular order one by one. It goes without saying that a similar process can be also implemented in case of vertical stacking shown in FIG. 5 (a group of workpieces sequentially stacked on and suspended from the rack 61).

A specific feature of the present embodiment is that the position of sensor 10 which is to be assumed for measuring the position and orientation of the topmost workpiece W1 is found by using data identified by the instructions in the program ("first sensor position and orientation determination"), but the position of sensor 10 which is to be assumed for measuring the position and orientation of other workpieces Wj (j=2, 3, . . . N) are determined based on the position and orientation of the preceding workpiece Wj-1 measured by the sensor 10 ("j-th sensor position and orientation determination").

Figure 6:
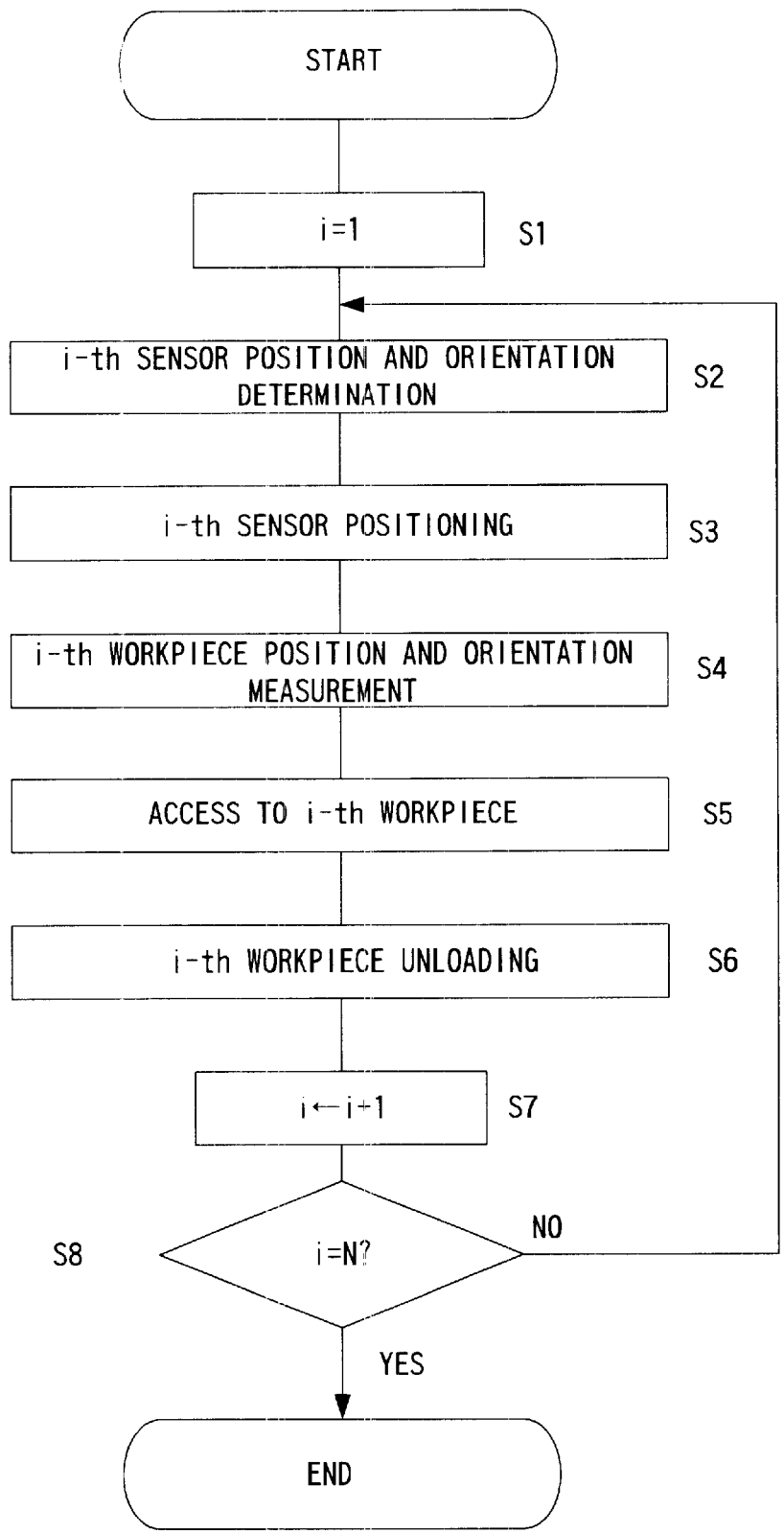
FIG. 6 is a flow chart illustrating schematically a processing procedure executed in the workpiece unloading apparatus of one embodiment of the present invention.

The flowchart of the above-described process is shown in FIG. 6. The essentials of each step are as follows.

Step S1: the workpiece unloading number index i is initially set to 1.

Step S2: the sensor position and orientation are determined which are to be assumed for measuring the position and orientation of workpiece Wi which is presently the topmost workpiece. When i=1, as described above, the data identified by the instruction are used without any modification. When i≧2, the sensor position and orientation are determined based on the calculations performed in the below-described step 4.

Step S3: the visual sensor is moved to a position determined in step S2.

Step S4: the position and orientation of workpiece Wi are measured with the visual sensor.

Step S5: the robot is moved to the unloading position of workpiece Wi.

Step S6: unloading of workpiece Wi is executed by the robot.

Step S7: the workpiece unloading number index i is increased by 1.

Step S8: a decision is made as to whether the index i has reached N (workpiece number). If N is reached, the present processing is ended, if not, the program returns to step S2.

In the example explained in FIG. 6, when the workpiece unloading number index is i (≧2), the measurement position of the sensor in step S2 is determined based on the results of measuring the position and orientation of workpiece Wi-1 in step S4 conducted when the index is i-1. Thus, the position and orientation of the sensor for measuring the workpiece Wi are selected as the position and orientation of the sensor suitable for measuring the workpiece Wi-1 (the position and orientation thereof have already bean measured).

Such a selection can be explained as follows. The position and orientation of workpiece Wi which is the uppermost (or frontmost) of the loaded workpieces differ significantly from those of the lowermost (or rearmost) workpiece WN.

However, the difference in positions and orientations between the workpiece Wi-1 that has just been unloaded and the current workpiece Wi is not that large and is typically within the measurement range of the sensor. Therefore, even if the position of the sensor measuring the current workpiece Wi is determined based on the position and orientation of the preceding workpiece Wi-1, the position and orientation measurements of workpiece Wi are quite possible.

If changes in the position and orientation of each individual workpiece are small, then the sensor measurement position can be updated for several workpieces, for example, 5 or 10 workpieces, rather than for each individual workpiece. In this case, the i-th sensor position and orientation in step 2 are determined as the previous ones, without recalculating, unless the i is a multiple of 5 or 10.

Alternatively, a method can be used by which the measurements are conducted by setting the sensor position to that of the previous measurement cycle till the measurements fail. Yet another possible method for determining the sensor measurement position comprises the steps of storing the position and orientation of sensor 10 during measurement of the preceding workpiece, or the position and orientation of robot 40 during workpiece unloading, in the robot controller 1 and determining the next sensor measurement position by using the position and orientation of the sensor during measurement or the position and orientation of the robot during workpiece unloading as a reference.

With still another method, variations of the sensor measurement position and orientation relating to each unloading are stored in advance in a robot controller memory according to the number and thickness of workpieces, and the sensor measurement position and orientation are changed by the variations for every unloading. For example, changing the measurement position by movement in the direction of approaching the workpiece by the thickness of one workpiece may be the variation in the sensor measurement position and orientation for each cycle.

Yet another possible method comprises the steps of positioning the sensor for a while in the position and orientation that have been stored in memory in advance (for example, the sensor position and orientation for measuring the topmost workpiece in a fully loaded state, or the sensor position and orientation during the preceding workpiece unloading), roughly measuring the position and orientation of the topmost workpiece, finding the sensor measurement position and orientation based on the results of rough measurement, moving the sensor to this position, measuring the workpiece position and orientation, and unloading the workpiece.

This method is especially effective when the workpieces are not in intimate contact with each other or the workpiece which is next to be unloaded can move, as in case of the workpieces stacked vertically as shown in FIG. 5, and the position and orientation of the topmost workpiece change significantly with respect to the position and orientation of the workpiece that has just been unloaded (or of the topmost workpiece in the preceding unloading).

In this case rough measurements may be conducted with the sensor 10 or by using a separately provided visual sensor (see a reserve sensor 110 in FIG. 1). For example, approximate position and orientation of the workpiece can be also measured by employing the image processing device 2 for processing the images picked up by the camera arranged in advance in the vicinity of housing member. The number of workpieces inside the transportation (housing) member decreases as the unloading proceeds in such a manner.

When the number of remaining workpieces and the thickness of loaded workpieces (the height or distance between the lowermost surface and the topmost workpiece) become less than the preset value, in order to replenish the workpieces or replace the housing member, a signal can be output to the outside or a message can be displayed to inform an operator about the necessity to replenish the workpieces. In this case, production efficiency can be increased by promptly replenishing the workpieces and replacing the housing member.

Alternatively, only when there is no workpiece on the bottom surface of the housing member (in case of horizontal stacking shown in FIG. 4) or at the farthest end (in case of vertical stacking shown in FIG. 5), the fact that the housing member is empty may be established by making a decision as to whether the workpiece is present by virtue of detecting with a visual sensor specific features such as marks that can be detected with the visual sensor or specific features of the housing member surface that are exposed when no workpiece is present.

In the explanation above, a case was assumed in which the prescribed number N of workpieces were supplied upon stacking in housing member 52 (FIG. 4) or on a rack 61 (FIG. 5). However, when the number N of workpieces loaded in the housing member 52 or on the rack 61 is not constant, information relating to loading, such as thickness and number of workpieces, the thickness of loaded workpieces, and the like is attached in a mechanically recognizable form, such as bar codes, marks, figures, or numerals to the prescribed zone of housing member 52 or rack 61. This information may be read out with a bar code reader or visual sensor to obtain initial values of workpiece loading information. Furthermore, the thickness of loaded workpieces can be also detected by measuring the loaded workpieces from the side surface with a visual sensor.

What is claimed is:

1. A workpiece unloading apparatus for unloading, at least one by one, a plurality of workpieces which are stacked vertically or horizontally, in a regular order starting from the topmost or frontmost workpiece, comprising:

a visual sensor for measuring the position and/or orientation of the topmost or frontmost workpiece;

sensor measurement position determination means for determining the position for workpiece measurement with said visual sensor;

sensor movement means for moving said visual sensor to the position determined by said sensor measurement position determination means; and workpiece unloading means for unloading the topmost or frontmost workpiece, wherein after said visual sensor has been moved by said sensor movement means to the position determined by said sensor measurement position determination means, information relating to the position and/or orientation of said workpieces is obtained by said visual sensor and said workpiece unloading means is caused to unload said workpiece based on this information.

2. The workpiece unloading apparatus according to claim 1, wherein said workpieces are any of metal plates which have been pressed or bent, flat or curved glass sheets, printed boards, flat boxes, flatly folded cloth or clothing, food plates, plastic moldings, and wood materials.

3. The workpiece unloading apparatus according to claim 1, wherein the determination of the visual sensor position by said sensor measurement position determination means is conducted repeatedly for every process or for every several processes of the workpiece unloading operation, periodically or non-periodically.

4. The workpiece unloading apparatus according to claim 1, wherein the determination of the visual sensor position by said sensor measurement position determination means is conducted based on the position and/or orientation of the workpiece measured by the visual sensor during the preceding or even earlier workpiece unloading.

5. The workpiece unloading apparatus according to claim 1, wherein the determination of the visual sensor position by said sensor measurement position determination means is conducted based on the measurement position and orientation of the visual sensor during the preceding or even earlier workpiece unloading.

6. The workpiece unloading apparatus according to claim 1, wherein the determination of the visual sensor position by said sensor measurement position determination means is conducted based on the position and/or orientation of the workpiece gripped by workpiece unloading means during the preceding or even earlier workpiece unloading.

7. The workpiece unloading apparatus according to claim 1, wherein the determination of the visual sensor position by said sensor measurement position determination means is conducted based on any from the thickness of one workpiece to be unloaded, the number of workpieces, and the thickness of loaded workpieces.

8. The workpiece unloading apparatus according to claim 1, wherein the determination of the visual sensor position by said sensor measurement position determination means is conducted based on the information which a second visual sensor obtained in the position that has been stored in memory in advance, this information relating to approximate position and/or orientation of the topmost or frontmost workpiece.

9. The workpiece unloading apparatus according to claim 1, wherein a three-dimensional visual sensor is used as said visual sensor.

10. The workpiece unloading apparatus according to claim 8, wherein the visual sensor whose position is determined by said sensor measurement position determination means is also used as said second visual sensor.

11. The workpiece unloading apparatus according to claim 8, wherein a visual sensor conducting two-dimensional image processing with a camera is used as said second visual sensor.

12. The workpiece unloading apparatus according to claim 1, wherein a robot is used as said sensor movement means and said visual sensor is mounted on a wrist or an arm of said robot.

13. The workpiece unloading apparatus according to claim 1, wherein a robot is used as said workpiece unloading means.

14. The workpiece unloading apparatus according to claim 1, wherein said sensor movement means also serves as said workpiece unloading means.

15. The workpiece unloading apparatus according to claim 1, wherein said plurality of workpieces, which are stacked vertically or horizontally, are housed in or supported by a housing member such as a pallet, a trolley, a rack or a hanger for suspending the workpieces, a box, or the like.

16. The workpiece unloading apparatus according to claim 15, wherein when the number of workpieces housed in or supported by said housing member, or the thickness of loaded workpieces is equal to or less than the prescribed value, a signal is output to the outside or a message is displayed.

17. The workpiece unloading apparatus according to claim 15, wherein a specific feature is provided on said housing member, this feature being concealed by a workpiece when the workpiece is present on the housing member, and it is decided whether the workpiece is housed in or supported by the housing member according to whether this specific feature is detected or not detected by a visual sensor.

18. The workpiece unloading apparatus according to claim 15, wherein information relating to at least one of the thickness of one said workpiece, the number of workpieces, and the thickness of loaded workpieces is provided by attaching to the housing member in a mechanically recognizable form, such as a bar code, figures, numerals, or marks, and any information on the thickness of one workpiece, the number of workpieces, and the thickness of loaded workpieces is automatically obtained by reading such information with a reading device.

19. The workpiece unloading apparatus according to claim 15, wherein when information on the thickness of said loaded workpieces is used, information on the thickness of stacked workpieces is obtained by detecting the information on the thickness of loaded workpieces with the visual sensor, second visual sensor, or other sensor means.

20. The workpiece unloading apparatus according to claim 15, comprising pressing means so that, when said workpieces suspended and supported on a rack or a hanger are unloaded, the presence or absence of the forward movement of the workpiece is detected from the position and/or orientation of the workpiece obtained by the visual sensor, and if the workpiece has moved forward, said pressing means presses the workpiece backward.

* * * * *